United States Patent [19]
Lancaster

[11] 3,744,336
[45] July 10, 1973

[54] MULTIPLE SPEED GEAR SHIFT
[75] Inventor: John T. Lancaster, Costa Mesa, Calif.
[73] Assignee: The Fenton Company, Gardena, Calif.
[22] Filed: July 29, 1971
[21] Appl. No.: 167,276

[52] U.S. Cl............................................. 74/473 R
[51] Int. Cl................................................ G05g 9/12
[58] Field of Search................ 74/473 R, 475, 476, 74/477

[56] References Cited
UNITED STATES PATENTS

| | | | |
|---|---|---|---|
| 3,057,222 | 10/1962 | Almquist, Jr. | 74/473 R |
| 3,082,639 | 3/1963 | Almquist, Jr. | 74/473 R |
| 3,172,301 | 3/1965 | Hurst, Jr. et al. | 74/473 R |
| 3,229,547 | 1/1966 | Hill | 74/473 R |

FOREIGN PATENTS OR APPLICATIONS

| | | | |
|---|---|---|---|
| 969,773 | 5/1950 | France | 74/473 R |

*Primary Examiner*—Milton Kaufman
*Attorney*—Albert M. Herzig, Edward C. Walsh et al.

[57] ABSTRACT

A multiple speed gear shift having a shifting handle that is movable laterally so its end part can engage in a recess in one of closely spaced parallel slide members. Interconnections are provided between the slide members and shift levers on a transmission. Pivoted apertured adaptor levers are provided as a part of the shift unit or as a separate accessory. The slide members attach by links to apertures in the adaptor levers and straight connecting links connect between other apertures in the adaptor levers and the shift levers on the transmission.

4 Claims, 8 Drawing Figures

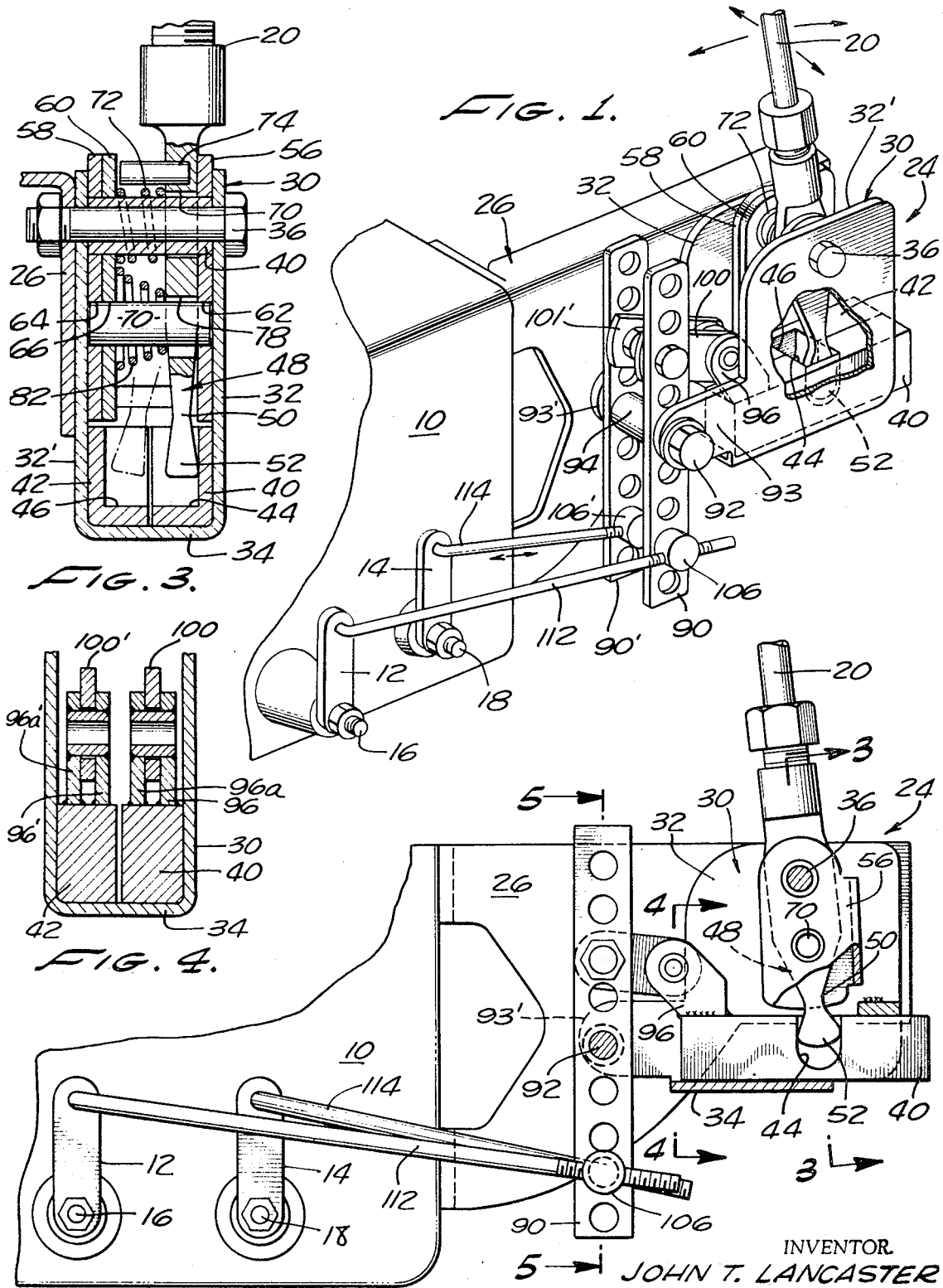

Patented July 10, 1973

INVENTOR.
JOHN T. LANCASTER
BY Herzig & Walsh
ATTORNEYS

MULTIPLE SPEED GEAR SHIFT

SUMMARY OF THE INVENTION

The invention relates to multiple speed gear shifting mechanism adapted for use with automotive vehicle engines and other engines.

BACKGROUND OF THE INVENTION

Multiple speed gear shifting units adapted for quick shifting are well known in the art, for example such as U.S. Pat. Nos. 3,052,135; RE255,561; and 3,229,547. Quite commonly prior art shiftors are of the H type shiftable between reverse, low, second, and high speed positions, typically the shift lever being movable laterally and being movable fore and aft in each of two lateral positions. Typically the shift lever is arranged to engage and move either pivoted shift levers or in some cases slide members. The shift lever has to engage with and disengage from the pivoted levers or slide members and quite commonly a pin or "bullet" provides for interengagement between the shift handle and the pivoted levers or slides. The prior arrangements are subject to certain deficiencies in that the pin is subject to wear and breakage and otherwise the mechanisms lack the desired simplicity, ruggedness and compactness of construction.

It is a primary object of the herein invention to provide a multiple speed shift mechanism which overcomes the deficiencies referred to and which specifically eliminates a part, that is the pin or bullet providing interengagement between the shift handle and the shifting elements that it engages.

A further object is to provide a shift mechanism comprising slide members closely juxtaposed side by side, and having recesses in them with the end of a shift handle engageable in the recesses and movable from one to another so that slide members can be individually actuated.

A further object is to provide a mechanism as in the foregoing embodying a U-shaped member which forms a slide for the slide members and with the shift handle pivotally mounted between the legs of the U-shaped member.

A further object of the invention relates to the interconnections between the shift unit and the automotive transmission. This object is to make it possible to adapt any installation to the use of straight links between the transmission and the shift mechanism by way of an adaptor unit comprising a pair of pivoted apertured levers which are connectable by links to the shift mechanism and then by straight links to the transmission. This object realizes the purpose of making it unnecessary to have a large inventory of different shaped connecting links for connection between the shift units and different shapes and configurations of transmissions.

BRIEF DESCRIPTION OF THE DRAWINGS

Further objects and additional advantages of the invention will become apparent from the following detailed description and annexed drawings wherein:

FIG. 1 is a perspective view of a preferred form of the invention;

FIG. 2 is a side view of the form of the invention showing FIG. 1;

FIG. 3 is a sectional view taken along the lines of 3—3 of FIG. 2;

FIG. 4 is a sectional view taken along the line of 4—4 of FIG. 2;

DESCRIPTION OF THE PREFERRED EMBODIMENT

Figure 5:
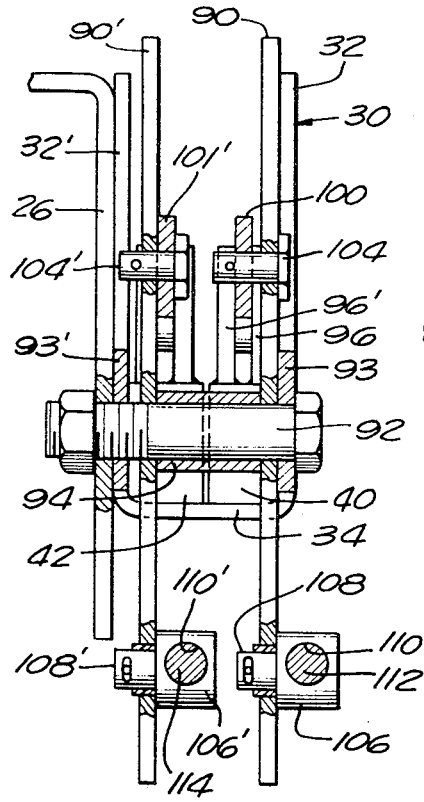
FIG. 5 is a sectional view taken along the line 5—5 of FIG. 2.

Referring now to FIGS. 1 through 5 of the drawing, numeral 10 designates a typical automative transmission having shift levers 12 and 14 on shafts 16 and 18 extending out from the side of the transmission. Typically these levers may be for shifting between low and reverse and between second and high. Levers 12 and 14 are shown in a 12 o'clock position. They might of course be in a 6 o'clock or other position representing neutral.

Numeral 20 designates a shifting handle which may be of typical construction forming part of the multiple speed shift unit 24. The shift unit may be mounted in the installation in various ways. By way of example it is shown mounted on the bracket 26 suitably secured to or mounted from the transmission 10 or other part of the vehicle.

The shift unit comprises the U-shaped member 30 having side parts 32 and 32' and a base or web 34. A bolt 36 extends transversely through the U-shaped member 30 as shown securing the shift unit to the bracket 26. Bolt extends through bushing 40 which will be referred to again presently.

Fitting in the lower part of the U-shaped member 30 is a pair of slide members or slide bars 40 and 42 adapted to slide in the channel formed by the U-shaped member 30. These members are closely spaced, side by side in juxtaposition. At an intermediate point in the upperside of these slide members each has a cut-out or recess designated at 44 and 46. The end part 48 of shift handle 20 is flat and it has a narrowed part 50 and then the end part is broadened and contoured to be rounded as may be seen at 52 to fit into the recesses 44 and 46 which have an arcuate or rounded contour.

Disposed against the inside surfaces of side walls 32 and 32' of the U-shaped member 30 are plates 56 and 58 which are apertured on the bolt 36 and the bushing 40 passing through the apertures in them. An additional plate 60 is provided adjacent to the plate 58. The plates 56, 58 and 60 have additional apertures as designated at 62, 64 and 66, spaced from the bolt 36 and received in these apertures is a transverse pin 70, the plates forming an assembly that is pivotally movable on the bolt 36 as a pivot shaft. The shift handle 20 has an opening 70 in it which as shown is larger than the bushing 40 passing through it to allow lateral tilting movement of lever 20 to a certain amount. Lever 20 is biased against the plate 56 by coil spring 72 and its tilting movement to the left in FIG. 3 is limited by stop pin 74 which can engage with plate 60.

The lever 20 has another aperture 78 in it through which the pin 70 passes and this hole or aperture also being larger than the diameter of the pin to permit the lateral tilting movement of the shift handle. The lower part of the shift handle is biased against the plate 56 by a coil spring 82.

Numerals 90 and 90' designate a pair of apertured adaptor levers which form an adaptor unit to facilitate interconnection of the shift unit to the shift levers of the transmission. This adaptor unit can be built as a part of the shift unit itself as shown in FIG. 1 or it may be provided as a separate accessory as will be described in connection with FIGS. 7 and 8. The adaptor levers 90 and 90' are pivotally mounted on pivot bolt 92 extending between lugs 93 and 93' on member 30 there being a bushing 94 on the bolt in between the adaptor levers as shown. Both adaptor levers are apertured along their lengths. Slides 40 and 42 are connected to the adaptor levers 90 and 90'. On the slide member 40 there is a yoke having upstanding yoke members or legs 96 and 96a and pivoted between these members is the end of the link 100 pivoted on a tubular pin or shift 102. A similar link 100' is attached to the slide 42. Pivot bolt 92 might of course be positioned at the ends of levers 90 and 90'.

The adaptor lever 90 is connected to link 100 by way of pin 104 and adaptor lever 90' is connected to link 101' by pin 104' and as may be seen in FIG. 5.

At the other end parts of the lever 90 and 90' there are provided connecting members or blocks 106 and 106' where are circular with extending stem parts 108 and 108' which can be fitted through apertures in the levers 90 and 90' and then secured by cotter pins or the like. Each of the blocks 106 and 106' has a threaded bore as designated at 110 and 110' to receive the threaded ends of straight link rods 112 and 114 the threaded relationship adapting the assembly for length adjustment of the straight links 112 and 114 which connect respectively to the transmission actuating levers 12 and 14. It may be observed that the links 100 and 100' are attachable to different ones of the apertures in the levers 90 and 90' and the straight links 112 an 114 are similarly attachable to different of the apertures in the adaptor levers 90 and 90'. The position of the adaptor levers 90 and 90' which are pivoted, and by reason of the apertures along their lengths it is possible to provide such an adaptor assembly so that shift unit can be installed in virtually any automotive unit using straight links 112 and 114. This accomplishes the important objective that it becomes unnecessary to provide a large inventory of connecting links having different makes and different shapes to accommodate to different sizes, shapes configurations and positions of transmissions.

Figure 6:
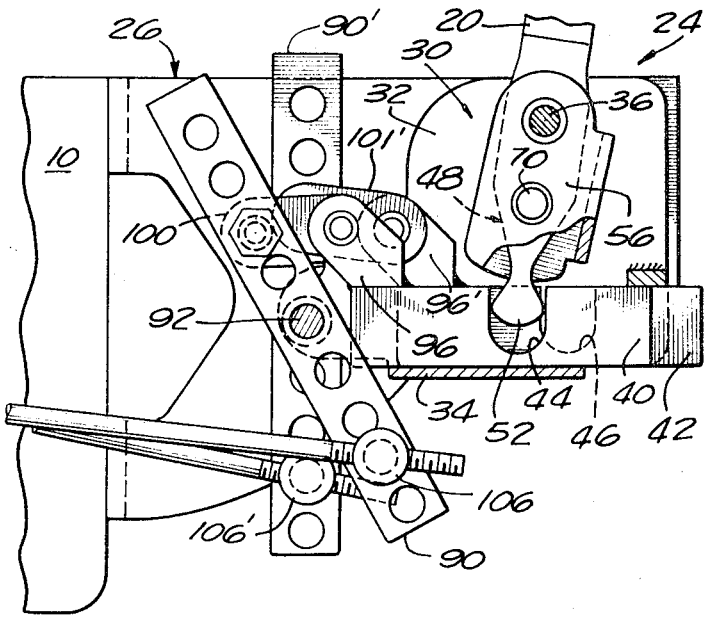
FIG. 6 is a view similar to FIG. 2 with the parts in a different position.

Referring to the shift unit 24 its operation will be understood by those skilled in the art. FIGS. 1 and 3 show the unit in a position with the shift handle 20 engaging the slide 40. As may be observed from FIG. 3 the shift handle can be tilted into the dotted line position of its end part 52 and the handle compresses the spring 82 which returns the handle to the full line position whenever it is released. The handle can tilt with respect to the bushing 40 in a limited amount, the spring 72 normally biasing against the plate 56 and the pin 74 acting to limit the movement. It will be observed that at the end part 52 of the shift lever, which can be made very sturdy and strong engages directly in the recesses 44 and 46, and the slide also can be made very sturdy and is extremely easy to move the shift handle laterally the small amount necessary to have it engage one or the other of the slides which are in side by side juxtaposed relationship and are normally and accurately guided in the U-shaped member 30. FIG. 6 shows the unit with the shift handle pulled to the right. As may be seen the mechanism is of simplified construction; it is extremely sturdy, very dependable in operation, and provides for maximum ease and rapidity of operation. The shift mechanism combined with the adaptor lever unit is highly adapted to the accomplishment of its purposes as outlined in the foregoing.

Figure 7:
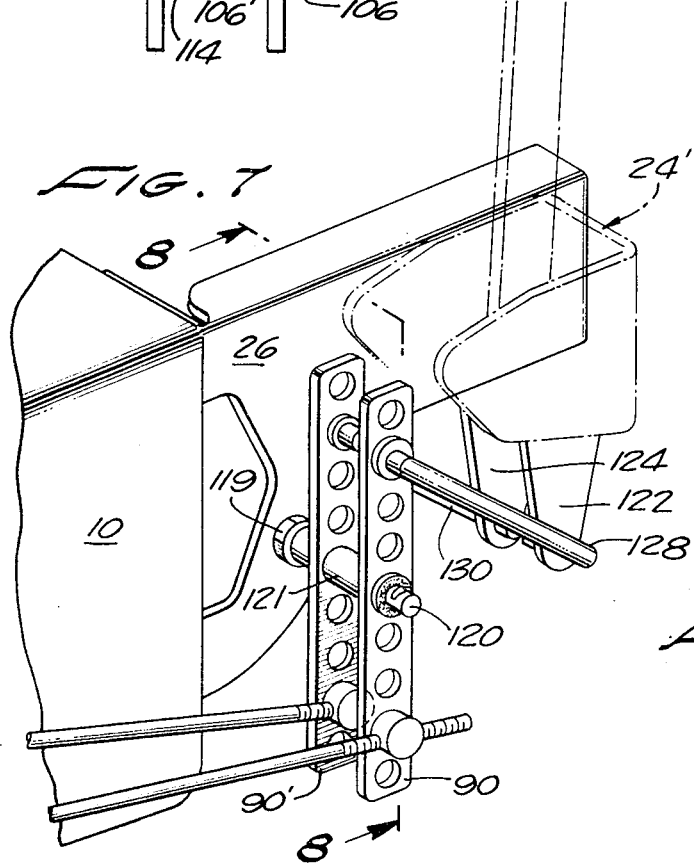
FIG. 7 is a perspective view of a form of the invention wherein the adaptor levers constitute an accessory which can be used with any shift.
Figure 8:
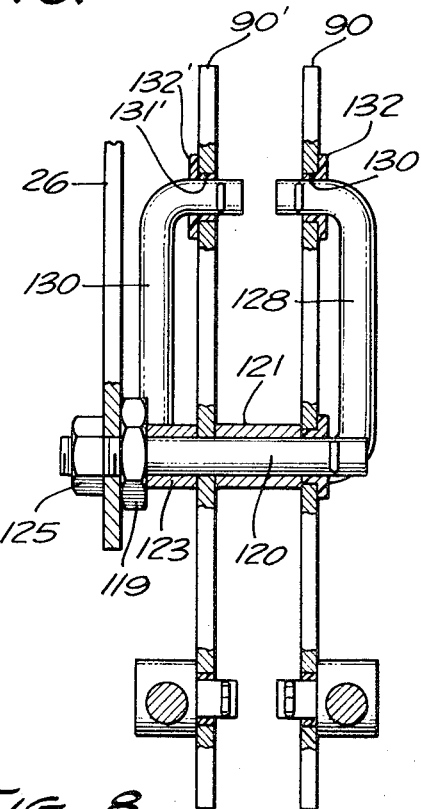
FIG. 8 is a cross-sectional view taken along the line 8—8 of FIG. 7.

FIGS. 7 and 8 adaptor levers 90 and 90' are mounted on a bolt 120 which extends from bracket 26. The gear shift unit 24' may be of any type and as shown by way of example it has pivoted shift lever members 122 and 124. On the mounting bolt 120 between the adaptor levers 90 and 90' there is a bushing 121. Numeral 119 designates a nut on bolt 120 with a bushing 123 between it and the lever 90' with another nut 125 on the end of bolt 120. Bolt 120 could be at the ends of levers 90 and 90'.

Numerals 128 and 130 designate a pair of link members which are in the form of rods having right angled end portions. The end portions are insertible through openings 130 and 131' in levers 90 and 90' these openings having washer bushings 132 and 132' in them made of a composition material. Right angle portions at the other ends of the link members 128 and 130 are similarly insertable into apertures in the levers 90 and 91 and connectible thereto. As may be seen the links 128 and 130 may be connected to various of the apertures in the levers 90 and 90' so that the results as described in the previous embodiment are secured. The bracket 26 and the adaptor links therefore may be manufactured and sold as an accessory so that the accessory may be utilized with any shift unit that is already installed or one that is being installed at the same time. The shift unit itself may have any type of mounting.

From the foregoing those skilled in the art will readily understand the nature and construction of the invention and the manner in which is achieves and realizes all of the objectives and advantages as set forth in the foregoing.

The foregoing is representative of preferred forms of the invention and is to be interpreted in an illustrative rather than a limiting sense, the invention to be accorded the full scope of the claims appended hereto.

What is claimed is:

1. A multiple speed shift mechanism comprising: a shifting handle; a plurality of parallel slide members; and means comprising a U-shaped member in which said members slide directly adjacent each other, each of said slide members having a recess in it, said recesses being alignable with each other, the shifting handle having a rigid end part engageable in a recess of a slide and the handle being movable to move a slide member along the slide means, said shifing handle having mounting means whereby its said end part can be moved laterally with respect to the slide members so as to engage in the recess in an individual slide member, said shift lever having a part that is pivotally mounted, said lever being movable about the pivot axis for movement of individual slide members, and means whereby the shift lever has limited freedom of movement in the direction of the axis of the pivotal mounting for purposes of moving its end part into a recess in an individual slide member.

2. A multiple speed shift mechanism comprising: a shifting handle; a plurality of parallel slide members; and means comprising a U-shaped member in which said members slide directly adjacent each other, each of said slide members having a recess in it, said recesses being alignable with each other, the shifting handle having a rigid end part engageable in a recess of a slide and the handle being movable to move a slide member along the slide means, said shifting handle having mounting means whereby its said end part can be moved laterally with respect to the slide members so as to engage in the recess in an individual slide member, said slide members being closely juxtaposed side by side in the slide means, said shifting handle being mounted on a shaft extending between the sides of the U-shaped member to pivotally rotate thereabout, and the shift handle being mounted to provide for limited lateral movement whereby its end part can be moved into the recess of one or another of the slides.

3. A shifting mechanism as in claim 1, including spring biasing means normally biasing the shift lever into engagement with a recess in one of the slides.

4. A shift mechanism as in claim 2, wherein the shift lever has a hole in it through which the said shaft passes, the hole being of a size to allow lateral tilting of the shift lever.

* * * * *